Nov. 25, 1941.    R. H. VERMILLION    2,263,790
AGITATOR
Original Filed Sept. 23, 1938

INVENTOR.
Raymond H. Vermillion,
BY
ATTORNEY.

Patented Nov. 25, 1941

2,263,790

UNITED STATES PATENT OFFICE 2,263,790

AGITATOR

Raymond H. Vermillion, Los Angeles, Calif., assignor, by mesne assignments, to Brinck Engineering Company, Inc., Los Angeles, Calif., a corporation of California Original application September 23, 1938, Serial No. 231,387. Divided and this application October 16, 1939, Serial No. 299,701

2 Claims. (Cl. 259—107)

This invention is an agitator, the present application being a division of my copending application Ser. No. 231,387, filed September 23, 1938.

It is an object of the invention to provide an agitator, applicable to processing apparatus such as employed for roasting coffee and the like.

More particularly it is an object of the invention to provide an agitator for spreading out and tumbling material and moving it circumferentially and radially back and forth in a processing chamber, such as the oven or the cooler of a coffee roasting apparatus.

Further objects of the invention will be readily understood from the following description of the accompanying drawing, in which.

Figure 1:
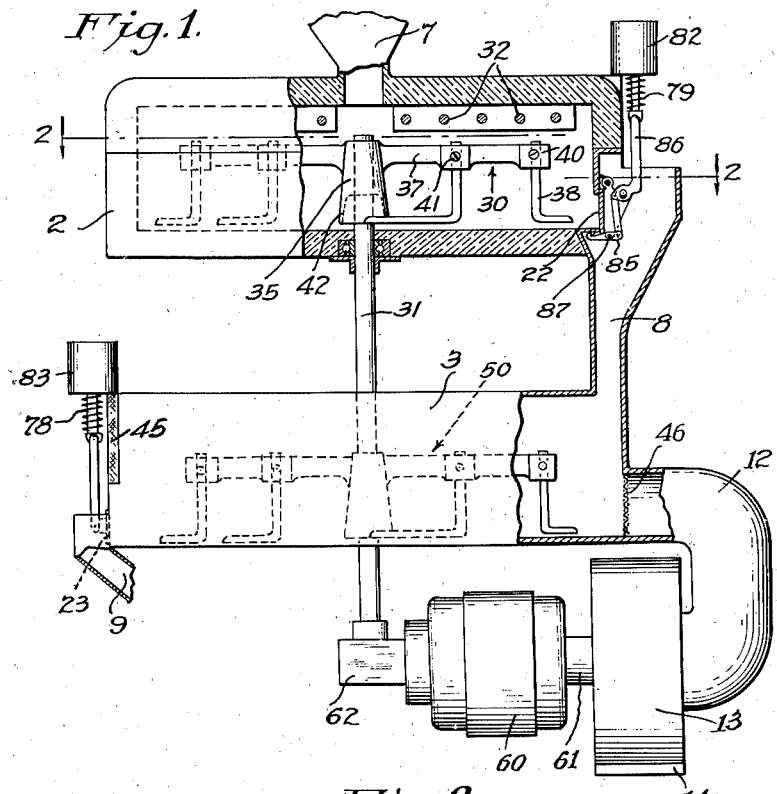
Fig. 1 is a side elevation, partly in axial section, of a coffee roasting apparatus embodying the invention.

The agitator is particularly applicable, and is herein described in connection with the oven and with the cooling chamber of a coffee roasting apparatus.

As an instance of such apparatus, the material to be processed, such as a green coffee, is supplied via funnel 7 to a roasting oven 2, and a discharge spout 8 leads from the roasting oven to a cooling chamber 3. From the cooling chamber the roasted coffee is discharged via a spout 9. Chaff from the roasted coffee may be withdrawn from the cooling chamber 3 via a spout 12, in which a fan 13 is mounted, the chaff discharging via the outlet 14 of the fan into a suitable sack (not shown).

Supply of green coffee to the roasting oven, via the funnel 7, may be controlled as disclosed in my aforementioned copending application Ser. No. 231,387, filed September 23, 1938. A door 22 controls discharge of roasted coffee from the roasting oven to the spout 8, and a door 23 controls discharge of roasted coffee from the cooling chamber 3 to the spout 9.

In the roasting oven 2, the green coffee which is supplied via the funnel 7 is spread out on the base of the oven and each individual coffee bean is turned over and over, and while the door 22 remains closed the mass of individually tumbling coffee beans are moved around the oven and radially back and forth therein. During this movement of the coffee it is roasted, preferably by heat generated by electrical heating elements 32 which are mounted on the underside of the top of the oven. When the coffee has been roasted and the door 22 is opened, the roasted coffee is moved around the oven for centrifugal discharge via the open door.

For thus tumbling the individual coffee beans and moving the coffee in the oven, an agitator 30 is employed. The agitator preferably comprises a hub 35 fixed on a shaft 31 and having a diametrical arm 37 fixed to the upper end of the hub below the heating elements 32. Shanks 38 depend from the arm 37 and terminate in lateral fingers which just clear the base of the oven 2. The fingers are adapted to move through the mass of green coffee so that the individual beans are tumbled over the fingers. In other words, the fingers are not propellers extending upwardly from the base of the oven such distance as to move the entire mass of coffee beans around the oven without the individual beans tumbling over the upper edges of the propellers, but plow through the mass of coffee beans below its surface, with the propelling fingers extending upwardly from the base of the oven only such restricted distance that the individual coffee beans resting on the base of the oven are tumbled over the fingers, thereby turning the individual beans over and over on the base of the oven. For example, the fingers may be rods of the same or smaller cross-sectional area than the shanks 38 from which they laterally project, so that the fingers contact the coffee beans throughout a vertical distance which at most is only several times the clearance between the fingers and the base of the oven, and which clearance is just sufficient for free sweep of the fingers without binding on the base of the oven.

The shanks 38 are rotatably adjustable in bearings 40 of the arm 37 and may be locked in adjusted position by set screws 41, so that the fingers may be positioned in any desired angular relation to radii of rotation of the agitator.

Figure 2:
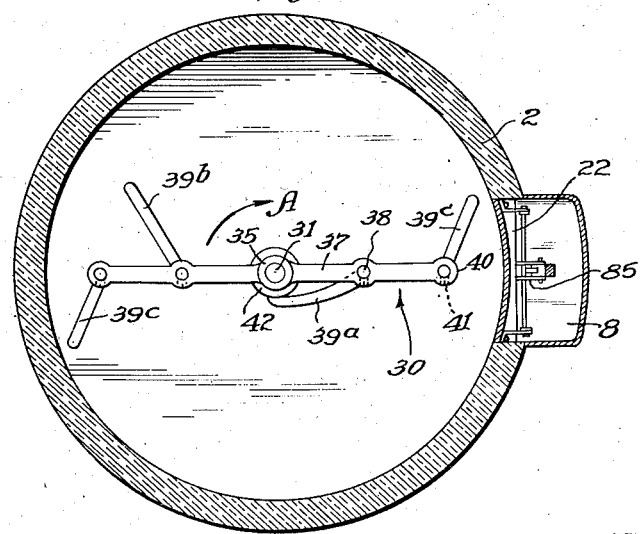
Fig. 2 is a section on the line 2—2 of Fig. 1.

The hub 35 preferably forms a tapering baffle 42 for directing the coffee away from the axis of rotation; and the fingers are adjusted so that while the door 22 is closed and during rotation of the arm 37 as indicated by arrow A (Fig. 2), the fingers move through the coffee, spreading it out and tumbling the individual coffee beans over the fingers and over and over on the base of the oven as above described, and at the same time moving the mass of individually tumbling beans around the oven and radially back and forth therein. For this purpose, one finger, designated 39a, engages the coffee adjacent the baffle 42 so that in addition to tumbling the individual beans over the finger it tends to centrifugally move the mass of tumbling beans; and another finger, designated 39b, tumbles the individual beans over the finger and also tends to centripetally move the mass of individually tumbling beans. The radially outer fingers, designated 39c, tumble the individual beans over the fingers and also tend to centrifugally move the mass of individually tumbling beans, and as the coffee collects at the outer periphery of the oven it flows back and over the fingers 39c into the path of the finger 39b, so that it is again spread out over the entire area of the oven. When the door 22 is opened, the fingers in addition to tumbling the individual beans over the fingers move the mass of coffee around the oven and eventually centrifugally discharge all of the roasted coffee through the open door and into the spout 8.

In the cooling chamber 3 the roasted coffee which is supplied via the spout 8 is similarly spread out and turned over and over, and moved around the cooling chamber and back and forth therein as long as the door 23 remains closed, and is then centrifugally discharged via said door when it is opened. During this movement of the roasted coffee, the fan 13 draws air into the cooling chamber via a screen 45 at the periphery of the cooling chamber diametrically opposite the spout 12, and thence across the cooling chamber and outwardly via the spout 12, the entrance to which is preferably screened as shown at 46. The roasted coffee is thus cooled prior to its discharge via the door 23, while chaff is drawn into the spout 12 from whence it is discharged at the outlet 14.

For moving the roasted coffee in the cooling chamber, an agitator 50 is employed, similar in all respects to the agitator 30 and therefore not described in detail. The hub of this agitator is fixed on the shaft 31 which depends from the roasting oven 2 and thence through the cooling chamber 3.

The shaft 31 may be driven by an electric motor 60 which may also drive the fan 13; the motor being preferably mounted below the cooling chamber 3, with one end of its shaft adapted for axially-alined direct connection with the shaft of the fan 13 as shown at 61, and with the other end of its shaft forming a worm drive for the shaft 31, with said worm drive housed within a casing 62.

An automatic control, not shown in this application but described in detail in my aforementioned copending application, supplies a measured quantity of green coffee via the funnel 7 to the roasting oven 2, and opens the door 22 after a predetermined time interval, for discharge of the roasted coffee into the cooling chamber 3, and then opens the door 23 after a predetermined time interval, for discharge of the cooled roasted coffee via the spout 9.

For this purpose the doors 22—23 are preferably electrically controlled, with automatically timed actuation of the electrical controls to provide the desired cycle of operation. As an instance, the doors 22—23 are respectively actuated by solenoids 82—83. The door 23 is preferably a sliding door which is positively opened when its solenoid 83 is energized, and which is preferably closed by a spring 78 when its solenoid is deenergized. The door 22 is preferably a hinged door, permitting opening and closing without the pressure which may be generated in the oven 2 tending to bind the door; and this hinged door preferably has a lock 85 (described in detail in my aforementioned copending application), whereby when the solenoid 82 is energized it elevates a slide 86, thereby first swinging the lock 85 at its pivot 87 so as to release the lock, and then swinging the door 22 to open position. When the solenoid 82 is deenergized, a spring 79 lowers the slide 86, thereby permitting the door 22 to swing to closed position by gravity, and then swinging the lock 85 at its pivot 87 so as to automatically engage for securing the door in closed position.

In operation, with the oven 2 heated, a measured quantity of green coffee is supplied thereto, the solenoid 82 being deenergized so that the door 22 is closed, and the solenoid 83 being energized for discharging from the cooling chamber 3 the batch of coffee which has been roasted during the preceding cycle of operation.

The agitator 30, due to the angular disposition of its fingers as previously described, spreads out and tumbles the coffee over the fingers and over and over on the base of the oven 2, and at the same time moves it around the oven and radially back and forth therein. The solenoid 83 is then deenergized and the door 23 closes; and the solenoid 82 is then energized, after a predetermined roasting period, thereby opening the door 22 for discharging the roasted coffee from the oven 2 into the cooling chamber 3. The solenoid 82 remains energized for an appreciable time, so that the door 22 remains open for a time interval sufficient to insure all the roasted coffee being centrifugally discharged from the oven 2 responsive to rotation of the agitator 30. The solenoid 82 is then deenergized and the door 22 closed, preparatory to the next batch of green coffee being supplied to the oven 2.

The roasted coffee which is discharged into the cooling chamber 3 (the discharge door 23 of which is closed) is spread out and tumbled over the fingers of the agitator 50 and over and over on the base of the cooling chamber and at the same time is moved around the cooling chamber and radially back and forth therein. The solenoid 83 is then energized, after a predetermined cooling period, thereby opening the door 23 for discharge of the roasted coffee via the spout 9. The solenoid 83 remains energized for an appreciable time, so that the door 23 remains open for a time interval sufficient to insure all the cooled coffee being centrifugally discharged from the chamber 3 responsive to rotation of the agitator 50.

The agitators 30 and 50 in the chambers 2 and 3 thus each provide for spreading out and tumbling the material being processed and moving it circumferentially and radially back and forth while the discharge door of the chamber is closed, and also provide for centrifugally discharging the material from the chamber while its door is open.

While the door of the chamber is closed, the fingers of the agitator gradually work the material out to the periphery of the chamber while tumbling the individual disintegrated particles of material over the fingers, but since the material cannot escape at the closed peripheral wall of the chamber it gradually accumulates at said periphery so as to gradually back up into the path of travel of the finger 39b which in addition to tumbling the individual particles of material over the finger gradually works the material back toward the center of the chamber, from whence it is again gradually moved out toward the closed peripheral wall. When, however, the door of the chamber is open, the material which is gradually moved out toward the peripheral wall and thence circumferentially around the same, is discharged via the open door without again backing up into the path of travel of the finger 39b, thereby clearing the chamber of the material which has been processed.

I claim:

1. In combination, a chamber adapted for agitation of material therein and having a peripheral wall, an agitator adapted for rotation in the chamber, the agitator having radially spaced and substantially horizontal fingers adjacent the base of the chamber for contact with material on said base for moving it relative to the base responsive to said rotation, the fingers being adapted for said contact throughout such restricted vertical distance as to tumble individual portions of the material over the fingers and over and over on the base while moving the material around the chamber, the fingers being angularly disposed with relation to radii of rotation so that during rotation of the agitator a radially inner finger directs the material centrifugally, a radially intermediate finger directs the material centripetally, and a radially outer finger directs the material centrifugally toward the peripheral wall, for reverse flow therefrom and over the last mentioned finger into the path of the intermediate finger.

2. In combination, a chamber having a material supporting base and an upstanding peripheral wall, and a rotatable agitator comprising a hub journaled in the chamber for rotation concentric with the peripheral wall, radial arms on the hub, shanks depending from and rotatably adjustably fixed relative to the radial arms, fingers projecting laterally from the shanks adjacent the base of the chamber for contact with material for moving it relative to the base responsive to rotation of the agitator, the fingers contacting the material throughout such restricted vertical distance as to tumble individual portions over the fingers and over and over on the base while moving the material around the chamber, the shanks being rotatably adjustably fixed relative to their radial arms for angularly disposing their fingers with relation to radii of rotation of the agitator so that a radially inner finger directs material centrifugally into the path of a radially intermediate finger, the radially intermediate finger directs material centripetally into the path of the radially inner finger, and a radial outer finger directs material centrifugally against the peripheral wall for reverse flow therefrom and over the last mentioned finger into the path of the intermediate finger.

RAYMOND H. VERMILLION.